United States Patent [19]

Haaker et al.

[11] Patent Number: 5,022,066
[45] Date of Patent: Jun. 4, 1991

[54] METHOD OF AND DEVICE FOR FORMING LAYER IMAGES OF AN OBJECT

[75] Inventors: Paul R. Haaker, Hamburg; Erhard P. A. Klotz, Halstenbek; Reiner H. Koppe, Hamburg; Rolf E. Linde, Haseldorf, all of Fed. Rep. of Germany

[73] Assignee: U.S. Philips Corp., New York, N.Y.

[21] Appl. No.: 798,507

[22] Filed: Nov. 15, 1985

[30] Foreign Application Priority Data

Nov. 22, 1984 [DE] Fed. Rep. of Germany ....... 3442448

[51] Int. Cl.⁵ .............................................. G06F 15/00
[52] U.S. Cl. ....................................... 378/2; 378/251; 378/901; 364/413.15
[58] Field of Search ............................. 378/23, 2, 901; 364/414, 413.15

[56] References Cited

U.S. PATENT DOCUMENTS

| | | | |
|---|---|---|---|
| 3,499,146 | 3/1970 | Richards | 250/61.5 |
| 4,598,369 | 7/1986 | Wang et al. | 378/22 |
| 4,630,296 | 12/1986 | Haaker et al. | 378/2 |

FOREIGN PATENT DOCUMENTS 2517268 10/1975 Fed. Rep. of Germany .

Primary Examiner—Edward P. Westin
Assistant Examiner—David P. Porter
Attorney, Agent, or Firm—William L. Botjer

[57] ABSTRACT

The invention relates to a method of forming images of layers of an object, and a device for performing this method. The layer images are formed from single-shadow images produced from different radiation source positions. The image values of the single-shadow images are first stored in a first as well as in a second memory. From the values of given image points in the second memory, a layer image value is calculated. The layer image value is added to the corresponding image points in a third memory. From the differences between these standardized sums in the third memory and the original image values in the first memory, there are formed correction values for correcting the image values in the second memory. Improved layer images are thus obtained.

5 Claims, 3 Drawing Sheets

METHOD OF AND DEVICE FOR FORMING LAYER IMAGES OF AN OBJECT

BACKGROUND OF THE INVENTION

The invention relates to a method of forming images of layers of an object. In the method, the object is irradiated from a plurality of radiation source positions in order to form separate single-shadow images. For each single-shadow image, image values are stored in a first memory. The image values depend on the absorption at image points. For each layer image point, a layer image value which corresponds to the absorption of the layer image point is derived from the stored image values of the shadow image points, from a number of images, which are geometrically associated with the layer image point. The invention also relates to a device for performing the method.

A method of this kind is described in U.S. Pat. No. 3,499,146 and from German Offenlegungsschrift No. 3,237,572 (corresponding to U.S. Pat. No. 4,630,296). In the method according to U.S. Pat. No. 3,499,146, the layer image value for an image point of the layer is formed by superposition of the image values of the shadow image points which are geometrically associated with the layer image point. In the method according to German Offenlegungsschrift No. 3,237,572, the layer image value of a layer image point is formed by that shadow image value, of the shadow image points of the single-shadow images geometrically associated with the layer image point, which corresponds to the lowest absorption. Even though the latter method of generating layer images produces more accurate layer images, it still gives rise to artefacts.

SUMMARY OF THE INVENTION

It is an object of the present invention to provide a method which produces more accurate layer images and which utilizes only limited storage means.

This object is achieved according to the invention by a method in which (a) first, the image values stored in the first memory for each image point of each single-shadow image are transferred to a second memory, while a third memory is erased, (b) a layer image value is formed for a layer image point of a layer from the values, stored in the second memory, of the shadow image points which are geometrically associated with the relevant layer image point, (c) the layer image value thus formed is added to the contents of the storage locations in the third memory which are associated with the relevant shadow image points, (d) the steps (b) and (c) are repeated for all image points of the layer, (e) the steps (b), (c) and (d) are repeated for a plurality of layers which cover the entire object volume, (f) for each image point the difference is computed between (i) the image value stored in the first memory, and (ii) the value stored in the third memory and multiplied by a standardization factor, (g) the difference is superimposed on the value stored in the second memory for the relevant image point, and (h) subsequently the step (b) is performed.

The invention is based on the recognition of the fact that after execution of steps (b) to (e), for each image point a value is stored in the third memory which should be proportional to the image value of this point in the first memory if the images of the individual layers were artefact-free. Therefore, the difference between the image value in the first memory and the image value in the third memory for each image point in step (f) is a measure for the errors introduced by generating the layer images from the values stored in the second memory for these various image points.

The difference generated in step (f) is used to modify the value stored in the second memory for this image point in step (g). When this has been done for all image points, the second memory will contain values for each image point of each single-shadow image which usually no longer correspond to the original image values but which enable more accurate images to be formed of a layer than could be obtained by the image values of the image points stored in the first memory.

The reconstruction of the layers of the object over the entire object volume is substantially a three-dimensional reconstruction. The values stored in the second memory for the image points of the various single images, are modified. Despite this three-dimensional reconstruction, however, the required storage capacity is comparatively small. No more than three memories comprising a storage location for each image point of each single-shadow image are required.

In a further version of the invention, the steps (b) to (g) are performed at least once more between the steps (g) and (h). Before the repeated execution of the steps (b) and (g), however, the third memory must then be erased. Due to the repeated execution of the steps (b) and (g), the values stored in the second memory are modified further in an iterative sense, so that the layer images produced by these new values form an increasingly better approximation of the true absorption distribution in the layer.

In a preferred version of the invention, the layers are chosen so that only one image point is geometrically associated with each layer image point in each single-shadow image. The layers may in principle be chosen at random, but in that case it is usually necessary to take into account several image points of a single-shadow image for the reconstruction of a layer image point. The weight of the values associated with these image points depend on the positions of the image points in relation to the layer image point to be reconstructed. The complexity is thus substantially increased. According to this further version, only one image point is required from each single image in order to determine the image value of the layer image point.

A device for performing the method according to the invention is provided with a radiation source array for generating a plurality of single-shadow images of the object. Each single-shadow image is produced from one radiation source position. An image converter is provided for converting each single-shadow image into an electric signal or a series of image values.

A first memory device stores these image values. A second memory device stores modified image values for each image point of each single-shadow image. A third memory device operates as an accumulator for the storage of layer image values for each image point of each single-shadow image. A first arithmetic device calculates for each image point the difference between (i) the value stored for this point in the third memory multiplied by a standardization factor, and (ii) the image value stored in the first memory. This difference is added to the contents of the storage location which is associated with this image point in the second memory.

The device further includes a layer image processing unit. The processing unit forms layer image values for a plurality of layers for each layer image point. The layer image values are computed from the modified image values, stored in the second memory, of the geometrically associated image points. A second arithmetic device adds the layer image values in the third memory to the contents of the storage locations which are associated with the image points from which the relevant layer image value is formed.

DESCRIPTION OF THE PREFERRED EMBODIMENTS

Figure 1:
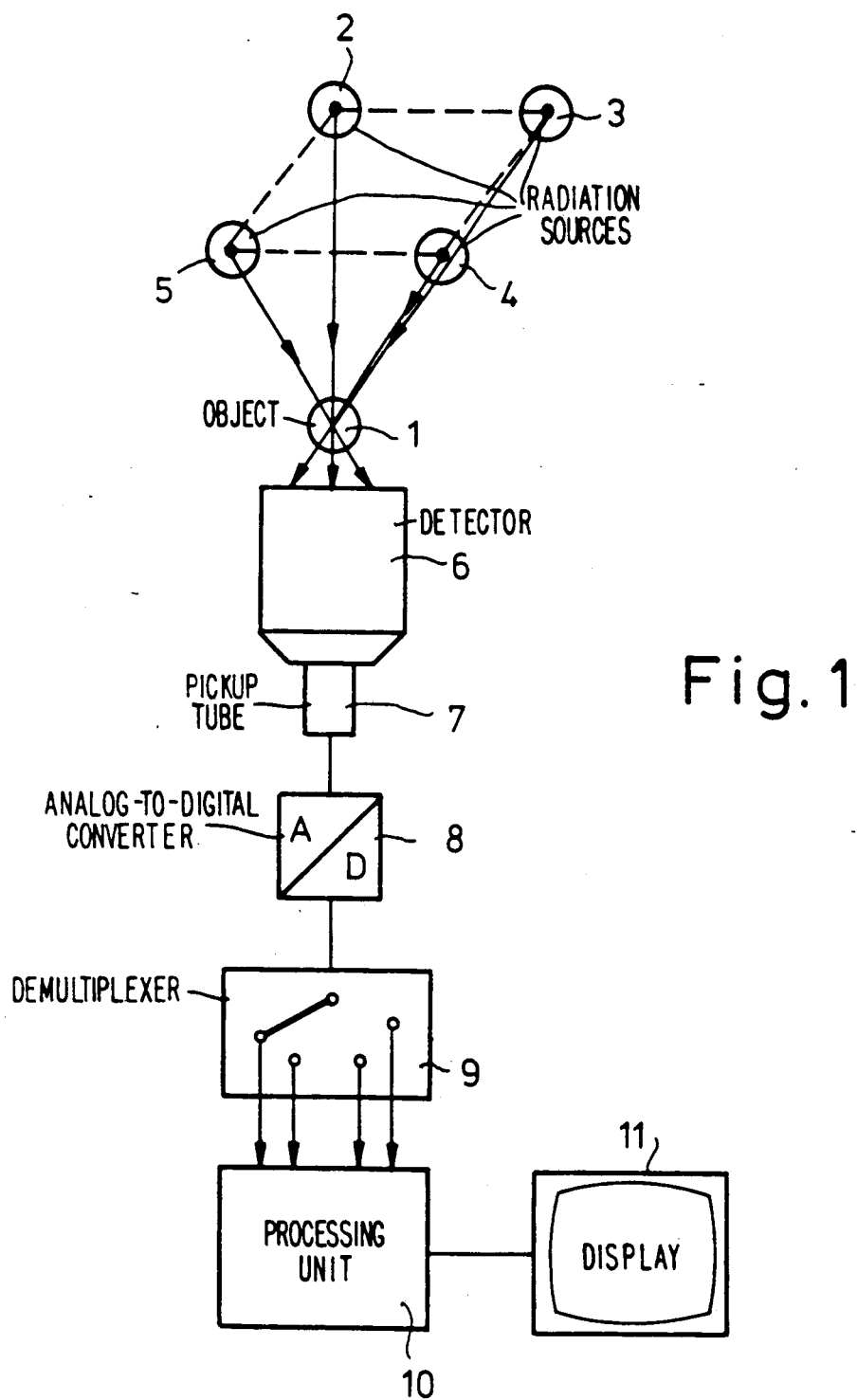
FIG. 1 schematically illustrates a device for forming images of a layer of an object according to the invention.

As shown in FIG. 1, an object 1 is irradiated by four radiation sources 2, 3, 4 and 5, for example X-ray tubes, whose centers of emission or focal points are situated at the corners of a square. During operation, the four radiation sources emit radiation beams which are represented by a straight line in the drawing but which, however, cover the entire object. The beams substantially register in a plane which is parallel to the plane of the square and which preferably also intersects the object 1. The radiation sources emit radiation of the same intensity and for the same period of time.

The X-rays influenced by the object 1 are converted into four spatially separated single-shadow images by an image detector 6. Detector 6 is, for example an X-ray image intensifier whose optical axis extends perpendicular to the plane of the square. Each single-shadow image represents the X-ray shadow image of the object 1 as formed by each one of the radiation sources 2 to 5.

The four single-shadow images are converted into an electrical signal by an image pick-up tube 7. The signal is converted into a series of binary coded data words by an analog-to-digital converter 8. The binary series is applied, via a demultiplexer 9, to a unit 10 for forming images of layers of the object 1. The images are displayed by an image display unit 11.

Each of the data words formed by the analog-to-digital converter represents the absorption-dependent image value in a small region of a single-shadow image. Each small region of a single-shadow image is referred to hereinafter as an image point for the sake of simplicity. Each single-shadow image consists of a multitude of such image points, in for example, 512 rows and 512 columns. Therefore, the analog-to-digital converter supplies 512×512 data words for each single-shadow image.

Figure 2:
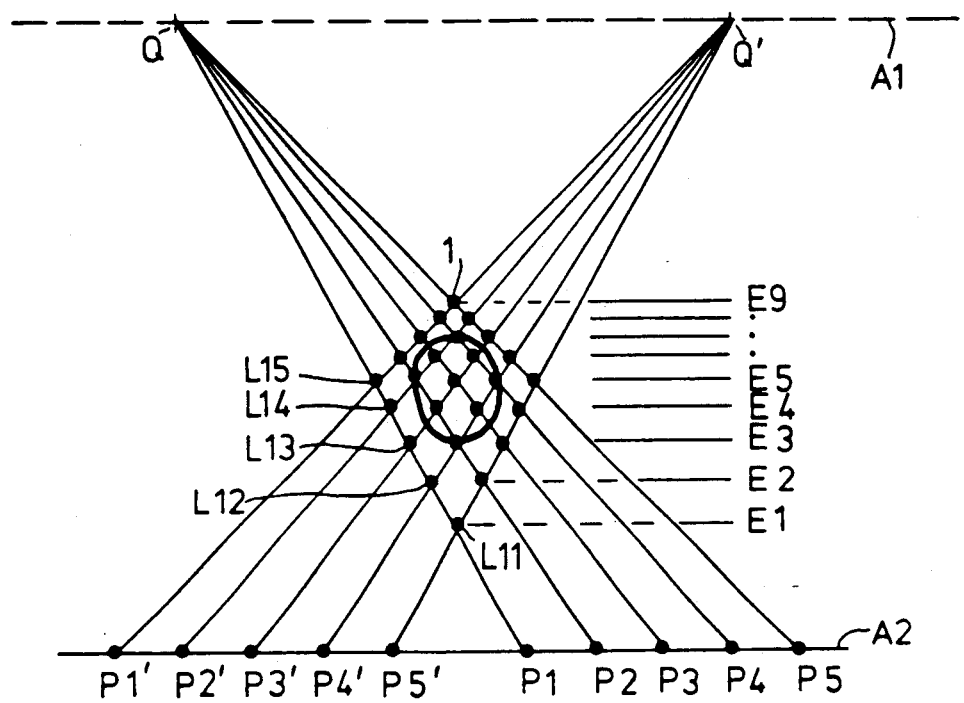
FIG. 2 schematically shows the geometrical relationships in such a device.

Referring to FIG. 2, the radiation sources 2-5 are situated in a plane A1. The image detector 6 has an entrance plane A2. In the plane A1 there are situated two radiation sources Q and Q', each of which emits a radiation beam for irradiating the object 1. In the plane A2 there are shown five points P1-P5 which are situated at the same distance from one another and which represent a row of image points of a single image produced by the source Q. It is assumed for the sake of simplicity that a single image consists of 5×5 image points. Also shown are five image points P1'-P5' of a row of the single image produced by the radiation source Q'.

The radiation source Q produces the associated five image points P1-P5 by five rays (the rays being defined by the centers of the image elements whose absorption is characterized by a respective data word). The same is applicable to the radiation source Q' and the image points P1'-P5'. The two groups of rays intersect in a multitude of layer image points which are situated in only nine layer planes E1-E9. This also holds true when the fact is taken into account that the single images themselves are two-dimensional and that instead of two radiation sources four of such sources are present at the corners of a square. In the case of n image points in a row, 2n−1 such layer planes would be present.

The values associated with the individual layer image points of such a layer can be derived from the image values of the single-shadow image points, for example, by summing or averaging as described in U.S. Pat. No. 3,499,146. For example, the layer image value for the layer image point L15 in the plane E5 is derived from the image values of the image points P1 and P1'. The value of the adjacent layer image point is derived from the image values of the image points P2 and P2'. The value of the layer image point situated on the other side in this plane is derived from the image values of the image points P5 and P5'.

For this layer the values associated with the layer image points are formed from the image values of the corresponding image points, for example P1, P1'; P2, P2' etc. In the layer E4 which is situated below E5, for example, the layer image value for the layer image point L14 is determined from the image values of the image points P1 and P2'. For the adjacent point in this layer, the layer image value is determined from the image values of the image points P2 and P3'. This means that the values of the layer image points of this layer are derived from the image points which originate from the single-shadow images which have been shifted through one image point.

For the layer which is situated next below (the layer E3), the layer image values are obtained by shifting the single-shadow images through two image points. For the layer planes E1-E9, therefore, each layer image can be defined by only one image point in each single-shadow image.

The invention is not restricted to the described layers. However, when the layers are different, it will be necessary to take into account several image points per single-shadow image in order to determine the value of the layer image point, so that the complexity of reconstruction is increased.

Figure 3:
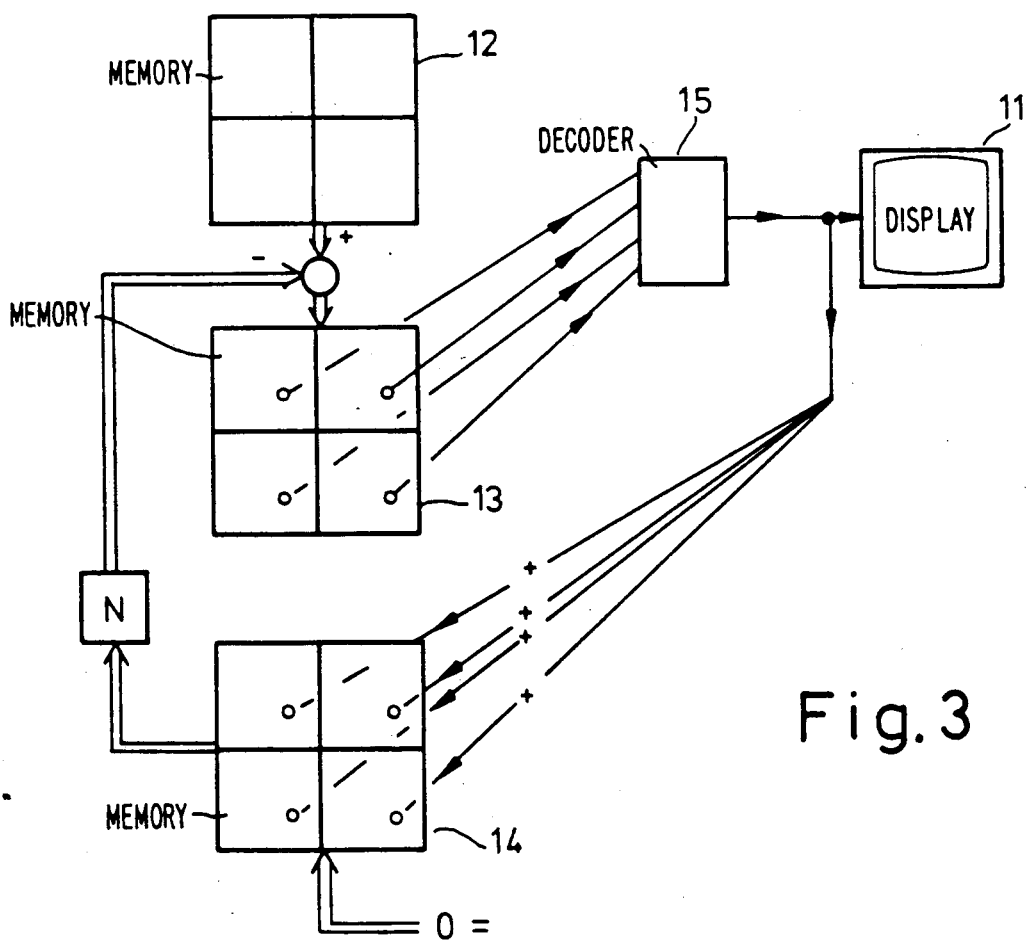
FIG. 3 schematically shows the individual steps of the method according to the invention.

As appears from FIG. 3, the processing unit 10 (FIG. 1) includes three memories 12, 13 and 14. Each memory includes as many storage locations as there are image points in the four single-shadow images. In the first memory 12 there are stored the image values which are supplied by the analog-to-digital converter 8 in the form of binary coded data words. At the beginning these values are also transferred to the second memory 13, while the contents of the third memory 14 are erased.

Subsequently, in a layer image decoding device 15 a layer image value is formed of one layer, for example the layer E5, from the values stored in the second memory 13 for the image points geometrically associated with this image point (P1, P1' and two further image points associated with the radiation sources which are not shown in FIG. 2). The layer image value should represent the absorption of the object at the layer image point L15. This value can be formed in the layer image decoding device by summing the values stored in the second memory 13 for these image points, by averaging, by selection of the smallest or the largest value, or in another manner. In the third memory 14 the layer image value thus determined for a layer image point (L15) is added to the contents of the storage locations associated with geometrically associated image points (P1, P1', . . . ). This operation is repeated for all points of the layer (E5). After that, the image of the first layer (E5) will be present in the memory 14.

The layer image determined by the decoding device 15 can at the same time be applied to a display unit 11 so that the layer image (still containing artefacts) can already be observed during processing.

Subsequently, another layer image is treated, for example the image of layer E4. The value formed by the layer image decoding device 15 for one point of this layer, for example the point L14, is again added to the contents of the memory locations associated with image points which are geometrically associated with this layer image point (for example, P1, P2'). After this layer has also been treated in the described manner, further layers are treated until all layers E1-E9 have been treated. The memory location associated with an image point of a single-shadow image then contains a correction value equal to the sum of the values calculated by the layer image decoding device for the layer image points geometrically associated with this image point; for example, the storage location for P1 contains the sum of the layer image values calculated for the points L11-L15.

If only the absorption of structures situated in the layer were taken into account for the layer images formed by the layer image decoding device 15, the sums stored in the third memory 14 for the individual image points of the single-shadow images would correspond to the image values stored for these image points in the first memory 12, except for a standardization factor which is the same for all image values. This condition is generally not satisfied in the layer image decoding devices known thus far. For example, when the value for a layer image point is derived from the sum or the mean value of the values of the image points geometrically associated with the relevant layer image point, the image of the layer will contain the structure of all other layers, be it in a more or less unfocussed form.

The differences between the image values or sums stored in the first memory 12 and the third memory 14 for an image point, caused by the fact that this condition is not satisfied, are utilized according to the invention for modifying the image values in the second memory 13. The values in the second memory 13 are modified in such a manner that a layer image formed from the modified values constitutes an improved representation of the actual absorption distribution in the layer.

To achieve this, for each image point a modified image value is formed. The modified image value equals the difference between (i) the image value stored in the first memory 12, and (ii) the sum value for the same image point which is stored in the third memory 14 multiplied by a standardization factor N. In the second memory 13 this difference is added to the contents of the storage location associated with the same image point of the same single-shadow image.

The standardization factor depends on the method of operation of the layer image decoding device 15. For example, when the layer image decoding device 15 calculates the mean of the image values associated with a layer image point, the sum value stored in the third memory 14 for an image point is too large by a factor which corresponds to the number of image points in a row. In the embodiment shown in FIG. 2 which involves only five image points, therefore, the sum value should be multiplied by N=0.2. An improved image is obtained even when the standardization factor does not correspond exactly to the ideal value. In that case, however, the improvement will not be quite as great.

After modification of the values stored in the second memory 13 for all image points, the third memory 14 is erased and the described cycle can be repeated. On the basis of the modified signals stored in the second memory, however, improved layer images are obtained. This improvement will be more pronounced as the described cycle is performed more times.

Figure 4:
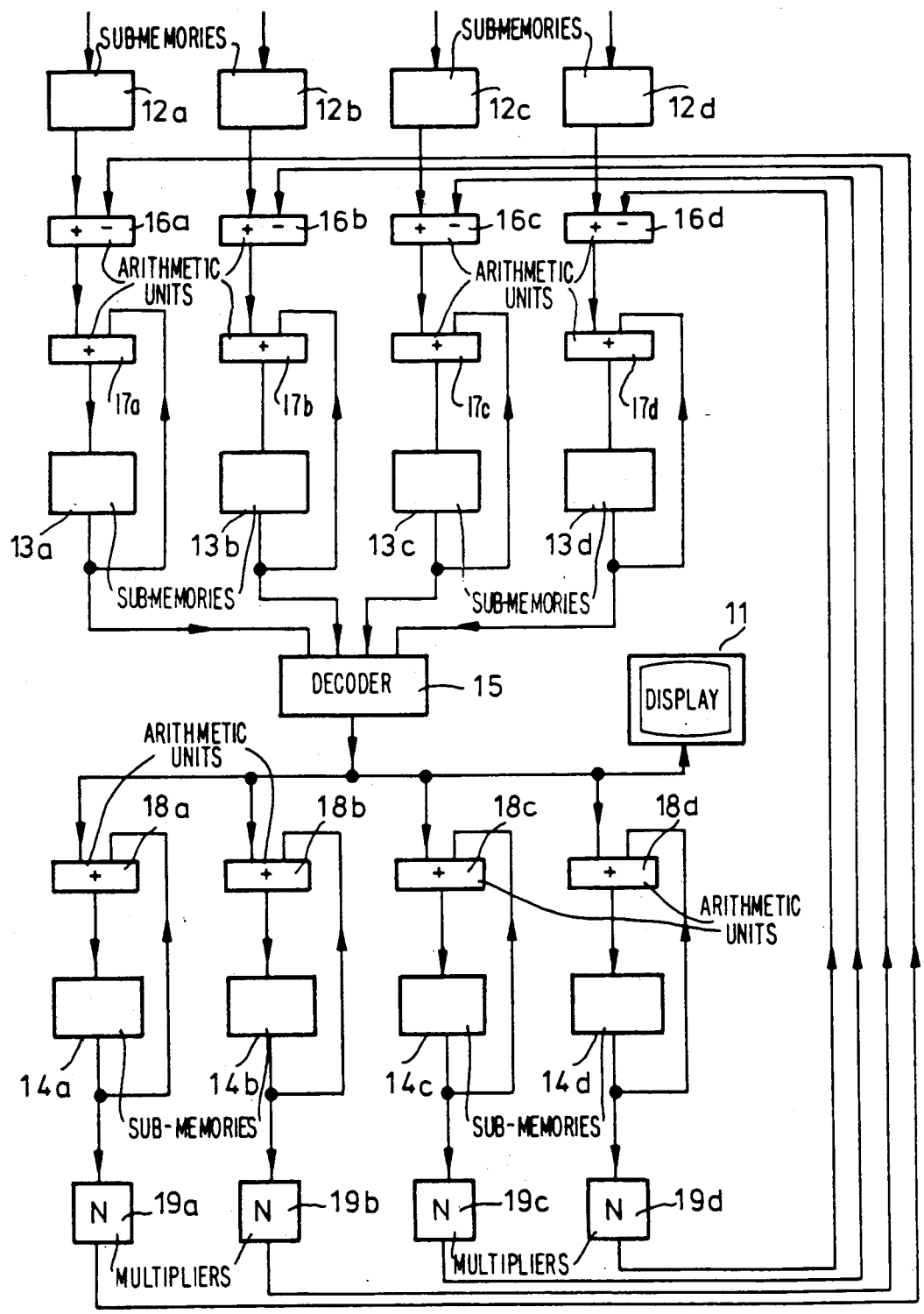
FIG. 4 is a block diagram of the processing unit 10 of FIG. 1.

FIG. 4 shows a block diagram of the unit 10 with its essential components. The first memory 12 consists of four separate sub-memories 12a-12b, whose inputs are connected to the outputs of the demultiplexer 9 (FIG. 1). Each sub-memory comprises as many storage locations as there are image points in a single-shadow image.

Each of the sub-memories 12a-12d is connected, via a first arithmetic unit 16a-16d and a second arithmetic unit 17a-17d, to four sub-memories 13a-13d. The four sub-memories 13a-13d together constitute the second memory 13.

The outputs of the sub-memories 13a-13d are coupled to a layer image decoding device 15. Decoder 15 may be, for example an adding device. The output of decoder 15 is connected, via arithmetic units 18a-18d, to the sub-memories 14a-14d which together constitute the third memory. The outputs of the sub-memories 14a-14d are connected via multiplier circuits 19a-19d (which subject the memory output signals to a standardization operation) to the inverting inputs of the arithmetic units 16a-16d.

The circuit shown in FIG. 4 is controlled by means of a control unit (not shown) as described below.

Before the beginning of an X-ray exposure, all sub-memories 12a-12d, 13a-13d, 14a-14d are erased. After the simultaneous or successive activation of the four sources 2-5, the data words supplied by the analog-to-digital converter 8 are sent, via the demultiplexer, to the four sub-memories 12a-12d of the first memory. The data is stored in such a manner that each of these sub-memories contains one single-shadow image. The storage locations which store the image values of corresponding image points preferably have the same addresses.

Moreover, the image values thus applied to the first sub-memories 12a-12d are added, via the arithmetic units 16a-16d and 17a-17d, to the contents of the storage locations having the same addresses in the second sub-memories 13a-13d. Because the second sub-memories 13a-13d and the third sub-memories 14a-14d have been erased the contents of the sub-memory 12a are thus transferred to the sub-memory 13a, the contents of the sub-memory 12b to the sub-memory 13b, etc. After that, each sub-memory initially contains the image values of a single-shadow image.

Subsequently, the contents of those memory locations are addressed which are associated with the image points geometrically associated with a layer image point. For example the image points P1, P1', are associated with the layer image point L15. The necessary addressing of the storage locations can be performed in the same way as described in German Offenlegungsschrift No. 3,237,572 notably as described with reference to FIG. 4. The layer image decoder 15 forms therefrom, for example by summing, a layer image. The layer image value is added, via the arithmetic units 18a–18d, to the sub-memories 14a–14d at the same addresses as those used to obtain the values from the sub-memories 13a–13d.

This operation is repeated for all layer image points of a layer. Afterwards, the layer image points of a second layer are processed. The layer image values then produced are added, via the arithmetic units 18a–18d, to the contents of the storage locations whose addresses correspond to the addresses of the values previously addressed in the sub-memories 13a–13d.

When all layers have been dealt with in this manner, the values associated with the individual image points are successively addressed in each of the sub-memories 14a–14d. Subsequently, these values are weighted by a standardization factor in one of the circuits 19a–19d and are subtracted (in one of the arithmetic units 16a–16d) from the image value stored in one of the sub-memories 12a–12d for the same image point. The difference thus formed is added in one of the units 17a–17d to the contents of the storage location in the second memory which has the same address or which is associated with the same image point.

Before the values of given layer image points are determined again from the values thus modified in the sub-memories 13a–13d, the sub-memories 14a–14d are erased. After that, the described cycle (generating layer images, adding the layer image values associated with the same image points in the sub-memories 14a–14d, standardizing the sum values, comparing with the image values, adding the differences to the contents of the (modified) values in the sub-memories 13a–13d, etc.) starts again. The layer images then produced by the once more modified values in the sub-memories 13a–13d produce an even better representation of the absorption distribution in the relevant layer. The described cycle can be repeated a number of times.

The layer images formed can be displayed on the display unit 11 during the individual cycles provided that this unit includes a memory for the layer image points. The operator can then interrupt the processing cycle at a given stage. However, it is alternatively possible to preset a given number of processing cycles.

The circuits 19a–19d which are used to weigh the contents of the sub-memories 14a–14d by the standardization factor N can in principle be connected also between the layer image encoder 15 and the arithmetic units 18a–18d or between the latter and the sub-memories. The separate values applied to the sub-memories 14a–14d, however, would then be smaller so that the errors introduced by rounding off would be greater.

For the embodiment shown in FIG. 1 it has been assumed that four radiation sources are used. However, it is alternatively possible to use a different number of radiation sources which are distributed so as to be situated at the corners of a regular, square raster for example nine or sixteen. In the case of a larger number of radiation sources, however, the image formation and processing would be more complex.

What is claimed is:

1. A method of forming images of layer of an object, said method comprising the steps of:

irradiating the object from a plurality of radiation source positions to form a plurality of separate single-shadow images, each single-shadow image comprising a plurality of shadow-image points, each shadow-image point having an image value proportional to the amount of radiation passing through the object and landing on the shadow-image point;

storing the image value for each of said shadow image points making up such single shadow image in a first memory;

transfering the image values of each of said shadow-image points to a second memory and erasing a third memory;

forming a layer image value from said image value stored in said second memory for each of a plurality of layer image points in each of a plurality of images of different layers of the object, each layer image value being formed from the image values of all shadow-image points geometrically associated with the layer image point;

accumulating each layer image value of said plurality of images of different layers in said third memory to form a correction value for each shadow-image point, each correction value being equal to the sum of the layer image values of all layer image points geometrically associated with the shadow-image point;

forming a modified image value for each shadow-image point, each modified-image value being equal to the difference between the image value of the shadow-image point stored in said first memory and the correction value of the shadow-image point stored in said third memory multiplied by a standardization factor; and storing a modified layer image value in said second memory for each layer image point, each modified layer image value being formed from the modified image values of all shadow-image points geometrically associated with the layer image point.

2. A method as claimed in claim 1, further comprising the steps of:

storing a second correction in said third memory for each shadow-image point, each second correction value being equal to the sum of all modified layer image values of all layer image points geometrically associated with the shadow-image point;

storing a second modified image value in said first memory for each shadow-image point, each second modified image value being equal to the difference between the image value of the shadow-image point and the second correction value of the shadow-image point multiplied by the standardization factor; and storing a second modified layer image value in said second memory for each layer image point, each second modified layer image value being formed from the second modified image values of all shadow-image points geometrically associated with the layer image point.

3. A device for forming images of a layer of an object, said device comprising:

first, second and third memories;

means for irradiating the object from a plurality of radiation source positions to form a plurality of separate single-shadow images, each single-shadow image comprising a plurality of shadow-image points, each shadow-image point having an image value proportional to the amount of radiation passing through the object and landing on the shadow-image point;

image converter means for storing said image value for each of said image points in said first memory;

means for transferring the contents of said first memory to said second memory;

means for storing a layer image value in said third memory for each of a plurality of layer image points in each of a plurality of images of different layers of the object, each layer image value being formed from the image values of all shadow-image points geometrically associated with the layer image point;

means for accumulating a correction value for each shadow-image point in said third memory, each correction value being equal to the sum of the layer image values of all layer image points geometrically associated with the shadow-image point;

means for storing a modified image value in said first memory for each shadow-image point, each modified layer image value being equal to the difference between the image value of the shadow-image point and the correction value of the shadow-image point multiplied by a standardization factor; and means for storing a modified layer image value in said second memory for each layer image point, each modified layer image value being formed from the modified image values of all shadow-image points geometrically associated with the layer image point.

4. A method of forming images of layers of an object, said object having a plurality of points, said images having a plurality of layer image points, each layer image point corresponding one-to-one with a point of the object, said method comprising the steps of:

irradiating the object from a plurality of radiation source positions to form a plurality of separate single-shadow images, each single-shadow image comprising a plurality of shadow-image points, each shadow-image point being geometrically associated with object points along each straight line connecting the shadow-image point to a radiation source position, each shadow-image point being geometrically associated with layer image points corresponding to the object points with which the shadow-image point is geometrically associated, each shadow-image point having an image value proportional to the amount of radiation passing through the object and landing on the shadow-image point;

storing the image value for each of said shadow image points in a first memory;

transferring each image value to a second memory and erasing a third memory;

forming a layer image value from said image values stored in said second memory for each layer image point, each layer image value being formed from the image values of all shadow-image points geometrically associated with the layer image point;

accumulating each layer image value of said plurality of images of different layers in said third memory to form a correction value for each shadow-image point, each correction value being equal to the sum of the layer image values of all layer image points geometrically associated with the shadow-image point;

storing a modified image value in said first memory for each shadow-image point, each modified-image value being equal to the difference between the image value of the shadow-image point and the correction value of the shadow-image point multiplied by a standardization factor; and storing a modified layer image value in said second memory for each layer-image point, each modified layer image value being formed from the modified image values of all shadow-image points geometrically associated with the layer image point.

5. A method as claimed in claim 4, further comprising the steps of:

storing a second correction value in said third memory for each shadow-image point, each second correction value being equal to the sum of all modified layer image values of all layer image points geometrically associated with the shadow-image point;

storing a second modified image value in said first memory for each shadow-image point, each second modified image value being equal to the difference between the image value of the shadow-image point and the second correction value of the shadow-image point multiplied by the standardization factor; and storing a second modified layer image value in said second memory for each layer image point, each second modified layer image value being formed from the second modified image values of all shadow-image points geometrically associated with the layer image point.

* * * * *